Patented Oct. 17, 1922.

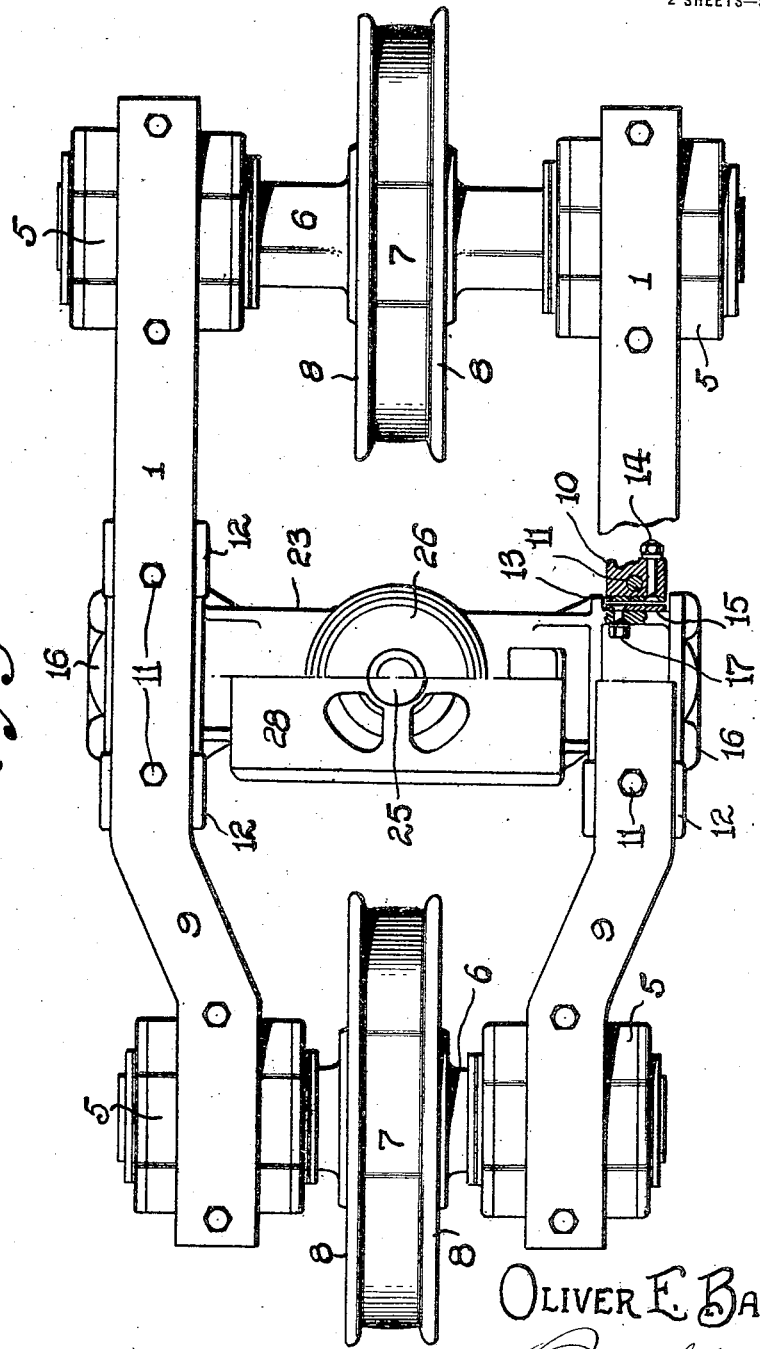

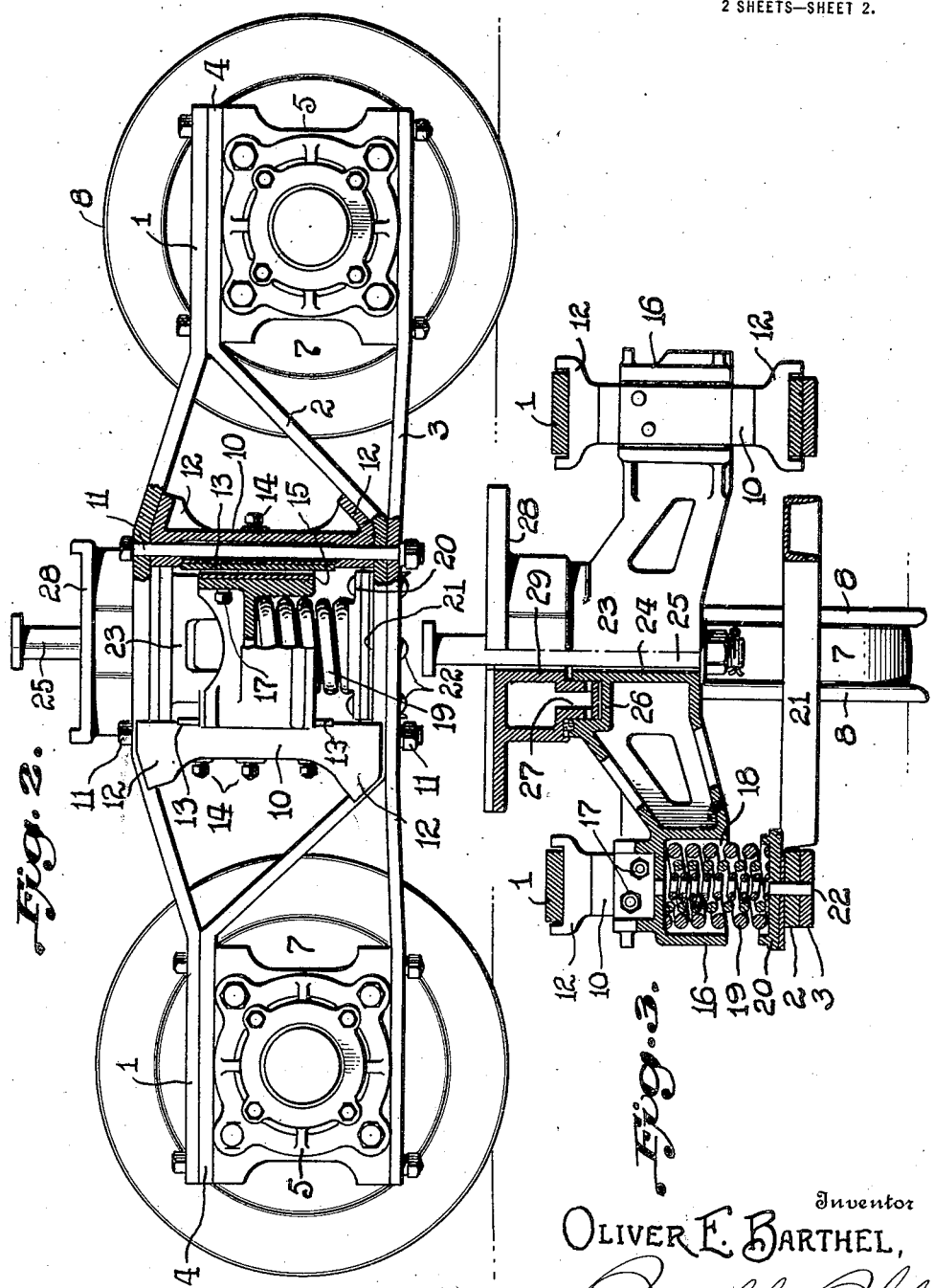

1,432,655

UNITED STATES PATENT OFFICE.

OLIVER E. BARTHEL, OF DETROIT, MICHIGAN.

MONORAIL TRUCK.

Application filed December 4, 1920. Serial No. 428,216.

*To all whom it may concern:*

Be it known that I, OLIVER E. BARTHEL, a citizen of the United States of America, residing at Detroit, in the county of Wayne and State of Michigan, have invented certain new and useful Improvements in Monorail Trucks, of which the following is a specification, reference being had therein to the accompanying drawings.

This invention relates to mono-rail systems for transportation, and has special reference to motor driven cars which travel on a single ground rail in contradistinction to two rails,—which are maintained upright by an overhead guide in contradistinction to side guides, gyroscopes and balancing devices, and which possess all the advantages of modern rolling stock and modes of operation.

Other or additional advantages are gained due to the low cost of rights of way and rolling stock; minimum operating space when used as a street railway system; and a minimum operating expenses and maintenance compared to sub-way, surface and elevated traction systems.

My invention involves a series of improvements which will be separately considered as trucks, brakes, motor suspension, a car body support, and this specification is directed to the trucks possessing the following characteristics:—

First, each truck has longitudinally alining double flanged wheels with one end of the truck of less width than the opposite end so as to provide clearance for a motor suspension without any danger of motors sagging at the sides of the truck.

Second, the double flanged wheels have rail engaging rim profiles or peripheries which are convex so that only the central portions of the wheel rims will contact with the rails and thus insure an even and smooth running of rolling stock provided with a truck. The convex wheel peripheries also permit slight lateral movement of a wheel, for instance when a car rounds a curve, when there is more or less shifting of the car body between its top and bottom supports.

Third, the truck includes journal boxes symmetrically located at each side of each wheel for transmitting load from the truck frame to the axles, and thence to the wheels.

Fourth, the truck includes novel side frame, bolsters, and bolster springs, with the latter disposed to receive shocks caused by rail joints and car oscillations due to variance of speed, braking power, etc. The frames are disposed to afford a substantial connection between the different parts of the rolling stock so that any side swaying of a car body will be transmitted to the wheels through the journal boxes and axles. The construction of each frame permits of desired flexibility, without sacrificing strength in a mono-rail truck.

The above are a few of the salient features of my invention and others will appear as the construction is understood in connection with the accompanying drawings, wherein Figure 1 is a plan of the truck;

Fig. 2 is a side elevation of the same partly broken away and partly in section; and Fig. 3 is a cross sectional view of the truck, showing a bolster partly in elevation.

A truck in accordance with this invention comprises two side frames, each composed of a top arch bar 1, a suspension bar 2, and a bottom arch bar 3. The top arch bar 1 has its center portion arched, and its ends disposed in lateral planes on top of the lateral ends 4 of the suspension bar 2, said suspension bar having its central portion depressed so as to afford a large opening between the central portions of the bars 1 and 2. The bottom arch bar has its central portion slightly arched to meet the bottom or depressed portion of the suspension bar 2, and the ends of the bottom arch bar are disposed in lateral planes parallel to the ends of the bars 1 and 2.

Between the ends of the bars 3 and 4 are mounted journal boxes 5 of a conventional form and journaled in said boxes are the ends of axles 6 provided with double flanged wheels 7, said wheels being disposed in longitudinal alinement in the central longitudinal axial plane of the truck, and each wheel has a convex rail engaging rim or periphery between flanges 8. The flanges 8 are adapted to extend downward at the sides of an ordinary rail and the convex peripheries avoid a line contact with the rail by simply having the center portion of each wheel contacting with the rail to permit of slight lateral movement of the wheel, relative to its rail, especially when rolling stock passes around a curve.

By reference to Fig. 1, it will noted that the truck frames have the ends thereof inset, as at 9 thereby placing the journal boxes at one end of the truck in closer proximity to the wheel therebetween than the relative positions of the journal boxes and wheel at the opposite end of the truck. This narrowing of one end of the truck permits of motors being suspended at the outer sides of the truck so that motive power may be applied to the axle at the narrow end of the truck, without necessarily subjecting the narrow end of the truck to overhang stresses and strains or improper balance relative to a rail, it being the purpose of my invention to maintain all truck elements as near symmetrical or balanced as is possible relative to the central longitudinal axis of the mono-rail truck.

Considering one of the side frames, as best shown in Fig. 2, the opening between the top arch bar 1 and the suspension bar 2 permits of pedestals 10 being placed in a side frame and retained therein by tie rods 11 extending through the pedestals and the bars 1, 2 and 3. Co-operating with the tie rods 11 in holding the pedestals in position are the upper and lower channel ends 12 of said pedestals which embrace the top arch bar 1 and the suspension bar 2, said pedestals having webs and fillers so as to co-operate with the tie rods in providing a rigid connection between the bars 1 and 2 of the frame.

The confronting faces of the pedestals 10 are longitudinally recessed to receive wear plates 13 detachably held in place by screw bolts 14, and these wear plates confront wear plates 15 on the sides of bolster ends 16 extending between the pedestals and movable in vertical planes between the bars 1 and 2. The bolster ends are somewhat H-shaped in cross section with the upper portion of each bolster end provided with screw bolts 17 for holding the wear plates 15, and the lower portions of said bolster ends afford sockets or housings 18 for nested or concentrically arranged coiled springs 19. These springs have the upper convolutions thereof loose in each housing and the lower convolutions thereof are seated in cups 20 mounted on the ends of the spring plank 21 connecting the side frames of the truck. The spring plank is in the form of an inverted channel member having its ends devoid of flanges so as to be sandwiched between the cups 20 and the suspension bars 2, and the bars 3 and 2, plank ends and cups 20 may be riveted or otherwise connected together, as at 22.

The bolster ends 16 are part of an arch shaped hollow bolster 23 having a central king bolt sleeve 24 providing clearance for a king bolt 25 adapted to swivel the car body and its support relative to the bolster 23. The top of the bolster is formed with an annular pocket 26 to receive the depending portion 27 of a center plate 28 and this center plate is adapted to be suitably secured to a car body so that the center plate may swivel the car body relative to the bolster. The center plate 28 has a center sleeve portion 29 fitting over the upper end of the king bolt sleeve 24 and providing clearance for the king bolt 25. The connection between the center plate 25 and the bolster is somewhat similar to a fifth wheel connection and suitable provision is made for lubrication, easy turning and to prevent lateral displacement of the center plate relative to the bolster.

From the foregoing it is obvious that the bolster ends 16 are yieldably supported between the pedestals 10 of each side frame and that during any vertical movement of the bolster relative to the side frames the confronting wear plates 13 and 15 insure an easy movement. On account of the constructive arrangement of the bars 1 and 2, it is practically impossible for the pedestals to separate, consequently there can be no shearing action against the tie rods 11 and the pedestals are held in position irrespective of said tie rods. As a matter of fact, the entire truck is fabricated to sustain a considerable load with a degree of flexibility that will prevent fracture of truck parts and equally distribute the load to the wheels of the truck, so that the load may be safely carried on a single rail.

What I claim is—

1. A monorail truck comprising wheels, and frames supported from said wheels and providing a truck narrower at one end than the other.

2. A monorail truck as in claim 1, characterized by the wheels being located one in advance of the other and each provided with double flanges.

3. A monorail truck as in claim 1, characterized by a bolster between said frames and a single wheel at each end of said truck.

4. A monorail truck comprising frames, journal boxes at the ends of said frames with the journal boxes at one end of the truck set closer to each other than the other journal boxes, axles journaled in said boxes, a wheel mounted on each axle, a bolster having ends yieldably supported in said frames, and a movable center plate on said bolster.

5. A monorail truck as in claim 4, characterized by said wheels longitudinally aligning, and a king bolt carried by said bolster in the same plane as said wheels.

6. A monorail truck as in claim 4 characterized by each frame including a top arch bar, a suspension bar, a bottom arch bar, and a spring plank connecting the bottom arch bars of said frames.

7. A monorail truck having side frames each composed of arch and suspension bars, said frames having inset ends providing a truck narrower at one end than the other, pedestals between the bars of each frame, a single wheel at each end of said truck supporting the ends of said frames, and a bolster having its ends supported between said pedestals, said bars and the ends of said pedestals being shaped to prevent spreading of said pedestals.

8. A monorail truck as in claim 7 characterized by said bolster having a center pocket, and a center plate movable on said bolster with a depending portion in the bolster pocket, and a king bolt extending through said bolster and said center plate.

In testimony whereof I affix my signature in presence of two witnesses.

OLIVER E. BARTHEL.

Witnesses:
ANNA M. DORR,
KARL H. BUTLER.